(12) United States Patent
Camiel (10) Patent No.: US 8,730,770 B2
(45) Date of Patent: May 20, 2014

(54) SYSTEM AND METHOD FOR FACILITATING THE HANDOVER PROCESS OF DIGITAL VINYL SYSTEMS

(76) Inventor: Noam Camiel, Tel Aviv (IL)

(*) Notice: Subject to any disclaimer, the term of this patent is extended or adjusted under 35 U.S.C. 154(b) by 734 days.

(21) Appl. No.: 12/785,471

(22) Filed: May 23, 2010

(65) Prior Publication Data

US 2011/0002479 A1 Jan. 6, 2011

Related U.S. Application Data

(60) Provisional application No. 61/223,008, filed on Jul. 3, 2009.

(51) Int. Cl.
*H04B 1/20* (2006.01)
(52) U.S. Cl.
USPC .................................. 369/4; 381/81
(58) Field of Classification Search
USPC .......... 369/4, 2, 3, 1, 5, 6, 7; 381/119; 700/94
See application file for complete search history.

(56) References Cited

U.S. PATENT DOCUMENTS

| 2003/0029305 A1* | 2/2003 | Kent et al. ................... 84/645 |
| 2003/0039176 A1* | 2/2003 | DePoalo ......................... 369/4 |
| 2005/0146996 A1* | 7/2005 | Roman ...................... 369/30.27 |
| 2005/0259532 A1* | 11/2005 | Roman et al. ................ 369/47.1 |
| 2006/0221776 A1* | 10/2006 | Roman et al. ..................... 369/1 |
| 2007/0280489 A1* | 12/2007 | Roman et al. .................. 381/119 |
| 2008/0013756 A1* | 1/2008 | Roman et al. .................. 381/119 |
| 2008/0144478 A1* | 6/2008 | Frederick et al. ............. 369/264 |
| 2012/0158162 A1* | 6/2012 | Hertz et al. ...................... 700/94 |

OTHER PUBLICATIONS

Bauer Industry, the Spacedeck Project, 1998.*
Bryan Premiers Mopho DJ Concept—Accelerometer & Gyroscope Scratchin, Feb. 12, 2013.*
Meet The Digital Vinyl Systems That Predated N2iT's Patent, Feb. 12, 2013.*
Rane—Rane Serato Scratch Live SL4 Digital Vinyl System, Feb. 12, 2013.*
Magma, Switchbox—Digital DJ, May 21, 2013.
Gizmo, Magma Switchbox Review, Nov. 2008.

* cited by examiner

*Primary Examiner* — Tan X Dinh (57) ABSTRACT

A system and method is introduced to facilitate the handover process of performers who are using digital vinyl systems (DVS). A DVS may be connected to an existing audio setup during the playing of another performer without interrupting the other performer and without disconnecting any connections in the existing audio setup. When the DVS is connected and a handover process is required, a switch is activated to select the DVS as the current active device for use. A DVS may be disconnected from an existing audio setup without interrupting another performer. The system may be implemented as part of an audio device or as a separate stand alone device.

15 Claims, 7 Drawing Sheets

SYSTEM AND METHOD FOR FACILITATING THE HANDOVER PROCESS OF DIGITAL VINYL SYSTEMS

CROSS-REFERENCE TO RELATED APPLICATIONS

This application claims the benefit of U.S. Provisional Patent Ser. No. 61/223,008, filed Jul. 17, 2009 by the present inventor.

FIELD OF INVENTION

This invention generally relates to digital vinyl systems, and more particularly this invention relates to the process of connecting and disconnecting digital vinyl systems.

BACKGROUND OF THE INVENTION

Disc Jockeys or DJs have been mainly using vinyl records and Compact Discs (CDs) for playing music before the mp3 format became popular. The move to digital media such as mp3 and other forms of audio storage formats allowed storing many musical tracks and songs using digital storage. Digital vinyl systems (referred to herein as DVS) allow DJs to manipulating the playback of digital music using turntables and CD players interface. Although the name DVS includes the word vinyl, this term is not limited to vinyl and refers also to other means that allow the manipulation of playback of digital music such as CDs. Serato Scratch Live and Tracktor Scratch are some examples of such DVS systems. These systems incorporate a hardware and software solution that allows a DJ to use a standard turntable, compact disc player or other interface to control and manipulate the digital music being played.

A DVS system receive a control signal that identifies the exact playing location, speed and direction so that the DVS can play the audio according to how the record or CD is being manipulated by the DJ. One way of sending such a control signal is by using a time code signal coded on special records or CDs specifically prepared for these DVS systems. When such records or CDs are used, the audio of the played time code is routed into the DVS so that the DVS decodes the exact playing location, speed and direction using the input audio signal. Another way of sending this control signal is by using a direct electronic signal that transmits data consisting of the location, speed, direction as well as other information. Such a direct electronic signal is may send MIDI data by using a MIDI controller for example that send midi information directly to the DVS. This MIDI information may be transmitted through a USB connection between the MIDI controller and the DVS system. In some cases special CD players include MIDI functionality for this purpose, making the use of a time coded CD redundant.

One major drawback to using DVS systems is the DJ handover process, when a DJ arrives to a venue and needs to set up the DVS equipment, sometimes when another DJ is playing. The venue may in some cases be quite dark, packed with people, the DJ booth may be small and the access to the connectors that the DVS needs to be connected to may be very limited. The requirement for the handover process is that is that the handover change between the currently playing DJ and the next DJ would be done consecutively; one immediately after the other. This used to be a simple matter when audio media such as CDs and vinyls where used but DVS system setup makes things more difficult. The problem also occurs when a DJ that uses a DVS completes playing and the next DJ comes up to play. In this case the DVS needs to be disconnected without interrupting the next DJ. When both DJs use DVS systems the problem is more complicated due to the many connections and disconnections that need to be done.

The difficulty of the DJ handover process is a result of the connections that are necessary for a DVS system to function properly. In a standard setup, a turntable and compact disk (hereby referred to as audio media devices) are connected directly to an audio mixer. To connect a DVS into this setup, the connection of the audio media devices is disconnected from the mixer and connected to the DVS inputs. This step allows the special time code media to be played into the DVS and be used by the DVS. Following this step, the DVS outputs are connected to the mixer. These steps may not seem to be difficult to make at home or in a studio, but these connections can be difficult during a club performance where another DJ is playing before you or after you and the transition of music between the DJs needs to be unnoticed by the audience. Adding to that the fact that the venue may be dark and the connectors and wires of the mixer and audio media devices may be not easily reachable. In some cases taking out a cable connection may even destroy the cable or even the mixer connector. Things can get even more difficult if both DJs have DVS systems.

One simplification to the problem has been to make special audio media players with MIDI functionality for sending MIDI control data via a USB connection to the DVS in order to remove the requirement of receiving a time coded audio from the audio media device. This solution still requires connecting the DVS to the venue mixer and only partially solves the problem since existing cables may need to be disconnected. This solution is only relevant for specific types of audio media players and certain types of DVS and this solution does not solve the problem for existing appliances, hardware and software.

There is thus a widely recognized need for way to simplify and facilitate the DJ handover process when switching between DVS systems and audio media devices or when switching between two DVS systems, in a manner that does not require changing the venue existing cable connections and that allows connecting or disconnecting a DVS without interrupting the other DJ that is playing, preferably during the playing of the other DJ.

SUMMARY OF THE INVENTION

A system and method is presented for allowing one person to set up or remove a DVS while another person is playing using the same audio media device allowing for an easy DJ handover process. Furthermore, this disclosure completely removes the requirement of disconnecting any existing wiring between audio media devices and audio mixer. This invention presents an audio switching device that may be part of an audio playing device, an audio mixer or a separate unit coupled to an audio media device or audio mixer. The audio switching device includes connections for a DVS allowing hooking up of a DVS while another person plays. The audio switching device also includes a switching mechanism for choosing an active device between audio playing device and one or more DVS connected. When a DVS is chosen by the switching mechanism as the active device the DVS is controlled by its coupled audio media player for manipulating the audio played by the DVS.

Furthermore, according to one aspect of the present invention there is provided an audio playing device configured to facilitate the handover process of Digital Vinyl Systems (DVS) said audio playing device comprising:

an audio media player for playing audio media;

an audio output connection for sending audio output out of said audio playing device;

one or more DVS connections for connecting one or more DVS to said audio playing device;

a switching mechanism for selecting an active device between said audio media player and said one or more DVS connections said switching mechanism configured for routing audio output of said selected active device to said audio output connection and said audio playing device configured for controlling said selected active device using said audio media player when said selected active device is a connected DVS device;

whereby a DVS is connected to one of said one or more DVS connections during the playing of a selected active device without interrupting routed audio of said selected active device to said audio output connection said switching mechanism is switched to set said DVS as active device when said DVS is connected to said audio playing device said audio playing device configured to route output of said DVS to said audio output connection and said audio playing device said audio playing device configured to control said DVS to facilitate DVS handover process.

According to a second aspect of the present invention there is provided an audio switching device coupled to an audio media player for switching between said audio media player and one or more connected Digital Vinyl Systems (DVS) to facilitate the handover process of DVS the audio switching device comprising:

an audio input connection for receiving audio from said coupled audio media player;

an audio output connection for sending audio signal out of said audio switching device;

one or more DVS connections for receiving an audio signal from DVS;

a switching mechanism for selecting an active device connection between said audio input connection and said one or more DVS connections said switching mechanism configured for routing selected active device connection to said audio output connection and said coupled audio media player configured to control a connected DVS when said connected DVS is selected as active device whereby said audio switching device configured to playback audio from said selected active device during setup of a DVS without interrupting playback audio of said active device to facilitate the handover process of DVS.

According to a third aspect of the present invention there is provided a method of facilitating the handover process of Digital Vinyl Systems (DVS) using a device coupled to an audio media player and having a switching mechanism for selecting an audio channel the method comprising:

a. playing audio of a currently selected audio channel in said device and routing said currently selected audio channel to audio output connection of said device, b. connecting a DVS to one or more DVS connections available in said device during playing of said currently selected audio channel without interrupting playing of said currently selected audio channel, c. selecting said DVS as currently selected audio channel using said switching mechanism when said DVS is connected to said device, d. playing audio from said DVS and controlling DVS using said coupled audio media player when said DVS is connected to said device and said DVS selected as currently selected audio channel.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

It will be appreciated that, for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DESCRIPTION OF THE PREFERRED EMBODIMENTS

The preferred embodiments teach a manner of facilitating the handover process of Digital Vinyl Systems (DVS) by allowing the connection or removal of a DVS from a coupled audio media player during the time when the audio media player is in use and playing audio. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention includes several embodiments that can be realized using an audio switching device for DVS coupled to an audio media player described herein. In this disclosure, the audio switching device for DVS coupled to an audio media player introduces additional connectors for DVS, allowing setting up of a DVS system with the coupled audio media player while audio is playing from another DVS system coupled to the audio media player or when audio is playing from the audio media player. Furthermore existing wiring connections between audio media player and audio mixer remains connected throughout the connection and removal of the DVS. Standard DJ setup includes an audio mixer connected to two or more audio media players such as a turntable or a CDJ. A DVS usually requires special media containing time code information be played by the audio media players which connect to it. This means that in the standard setup each audio media player needs to be disconnected from the audio mixer and connected into the DVS inputs to pass time code data into the DVS. The DVS then send out the manipulated audio signal which is then connected to the audio mixer. The present disclosure includes additional connectors intended for DVS systems so that existing wiring connection between audio media players and audio mixer remain connected and unchanged throughout DVS connection and removal. The necessary steps for connecting a DVS system in the present embodiment of the audio switching device, is to connect the DVS to the additional added DVS connectors. These connections may include DVS input connections for receiving time code signal. When the DVS is fully connected, a switch mechanism in the audio switching device selects the active device by choosing DVS mode or Audio mode for playing audio directly from the audio media device. The connection of the DVS to the DVS connectors in the audio switching device does not interrupt the played audio of the audio media player allowing the connections of the DVS to be made while the audio from the audio playing device is being played. When the DVS connection is made and a switch to DVS is desired, the switch mechanism is changed to DVS mode and DVS is immediately ready for use. The audio played by the DVS is routed to the same audio output as used by the audio media player; The audio from the audio media player is routed to the DVS inputs so that the DVS is controlled by the audio media player. When DVS use is complete and audio from audio playing device is desired, the switch mechanism can be changed to Audio mode allowing playing audio through the audio playing device. At this time the DVS connections may be removed from the added DVS connections without interrupting the audio being played by the audio playing device. In this manner a handover process between two DJs one using audio playing device and the other using a DVS system is greatly simplified by allowing simultaneous setup of DVS equipment and playing back of audio. The transition between the DJs is at this point a smooth transition which is basically includes a change of a switch. In addition when DVS equipment is set up no existing cable connection between audio playing devices and mixer needs to be disconnected. The handover process between two DJs both using DVS systems is similarly simplified as explained further in this disclosure.

The term DVS used throughout in this document applies not only to Digital Vinyl Systems that use vinyl but generally to systems capable of allowing a user to manipulate the playback of digital audio files on a computer using an interface including turntables, and CDJs. The term DVS is meant as a generic one throughout this disclosure.

Figure 1:
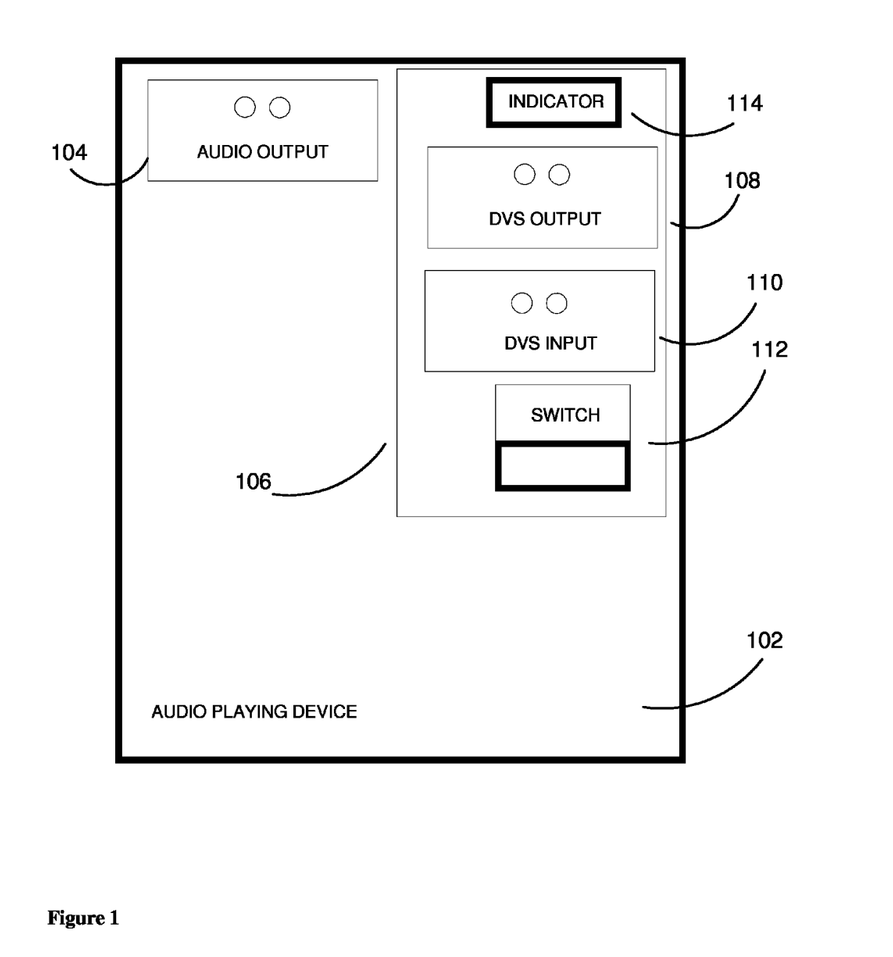
FIG. 1 is a block diagram illustration of an audio playing device equipped with an audio switching device for DVS, in accordance with an embodiment of the present invention.

Reference is now made to FIG. 1, which is a block diagram illustration of an audio playing device equipped with an audio switching device for DVS, in accordance with an embodiment of the present invention comprising audio media player such as a turntable or CD player not shown in the drawing, the audio media player is contained within audio playing device 102. The audio playing device further comprising an audio output 104 for outputting the audio playing device audio output, a DVS connection unit 106 for connecting the audio playing device to a DVS without interrupting the audio output from audio output 104. The DVS connection unit 106 comprises a DVS output 108 that connects into a DVS; a DVS input 110 for receiving input from a DVS; a switch 112 to switch between DVS mode and audio media player mode; and an indicator 114 to indicate whether the audio playing device is in DVS mode or in audio media player mode. When the system is in audio media player mode the audio of the audio media player travels directly into output 104. When the system is switched to DVS mode the audio played by the audio media player (if any) is routed to DVS output 108 instead of to audio output 104. If a special media containing a time code signal is used in the audio media player then this DVS output signal will contain the time code audio signal to indicate to the DVS the required manipulation of the digital audio to currently play. In addition, when the system is switched to DVS mode the signal from DVS input 110 is routed to audio output 104 to output the DVS audio through the same connection as when the audio media player mode is used. As a result, connecting a DVS to the audio playing device 102 does not require any change in existing wiring connections between audio playing device and a device connected to it that receives its output such as an audio mixer. Furthermore, when audio from the audio media player is playing, a DVS may be connected or disconnected using the DVS connection unit 106 without interrupting the audio playing of the audio media player. When a DVS is fully connected and a DJ handover is required all that is needed for changing between DVS mode and audio media player mode is to change the switch 112, and similarly when a DJ using a DVS wants to change with a DJ using the audio media player, the change or handover process is as simple as changing switch 112.

The switch 112 may be viewed as a way to select an active device so that the active device chosen by switch 112 is the one that the audio output plays. Furthermore, audio of active device is manipulated by the controls of the audio media player.

After the switch is changed to audio media player mode and audio plays from the audio media player, the DVS connections can be disconnected without interrupting the audio from the audio media player. Therefore two DJs one using a DVS and the other playing audio media such as CDs or records can easily change between themselves by changing a switch, without disconnecting existing connections between audio media player and a mixer for example and without the need to wait for connections or disconnections of a DVS to be made. In some embodiments no time code audio is required and no need exists to route played audio signal into DVS output 108. Such a case may be when audio media player is equipped for example with a MIDI controller and can output control information to the DVS using a USB connection.

In some embodiments an additional headphone piece may be added to the audio playing device for monitoring DVS input while audio media player is playing. This is useful in order to make sure the DVS connections are properly connected during audio media player mode when the audio media player is playing. In this manner the user to play next can make sure that when changing the switch to DVS mode, the DVS inputs will be ready to play and that the connections and cables are connected properly.

The presented device in FIG. 1 adds connections to a DVS in a clear and simple manner. Various switchboxes for example which may have some switching functionality but since these are not dedicated for DVS use and do not for example switch both time code signal and DVS input, such can cause confusion especially in the middle of a performance and therefore undesired.

In some embodiments the connections of DVS input 110 and/or DVS output 108 may be implemented for example in USB or other similar means so that the audio travels through the USB connection in this example instead of through connections as mentioned above. The audio in this case as well travels directly into output 104 connectors. In this embodiment and in other embodiments as well, the switching between DVS and audio media player modes may become automatic or controlled from the DVS. In some embodiments where time code data is not required, such as when control data is received from the audio media player through a USB or MIDI connection, only DVS input 110 is required; Audio channel may also travel through a USB connection and in some embodiments, a single USB connection can include both. As a result, only a USB connection may be used. In some embodiments the switch may become unnecessary. In some systems, both USB approach and external connectors may be present.

Figure 2:
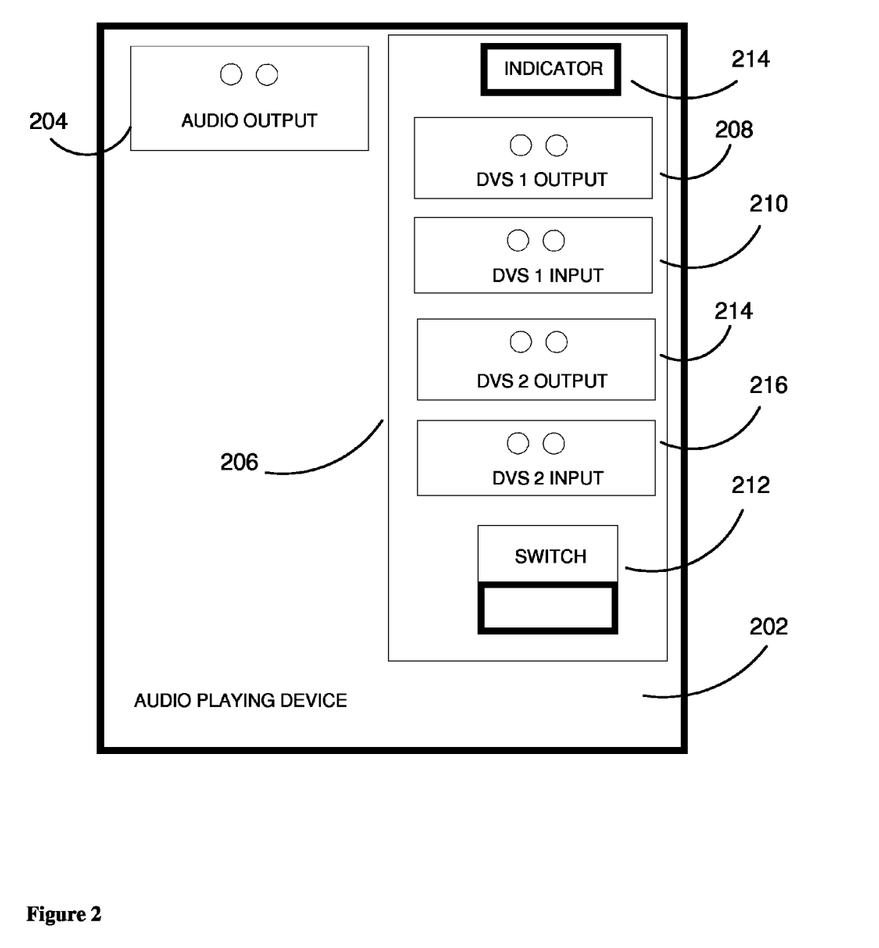
FIG. 2 is a block diagram illustration of an audio playing device equipped with an audio switching device for a pair of DVS, in accordance with an embodiment of the present invention.

Reference is now made to FIG. 2, which is a block diagram illustration of an audio playing device equipped with an audio switching device for a pair of DVS, in accordance with an embodiment of the present invention comprising an audio media player such as a turntable or CD player not shown in the drawing contained within audio playing device 202, an audio output 204 for outputting the audio playing device audio output, a DVS connection unit 206 for connecting the audio playing device to a DVS without interrupting the audio coming from audio output 204. The DVS connection unit 206 is different to the DVS connection unit 106 of FIG. 1 in that it can connect not just one but two DVS. The DVS connection unit 206 comprises a DVS 1 output connection 208 that connects into a first DVS; a DVS 1 input 210 for receiving input from a first DVS; a DVS 2 output connection 214 that connects into a second DVS; a DVS 2 input 216 for receiving input from a second DVS; a switch 212 to switch between DVS 1 mode, DVS 2 mode and audio media player mode; and an indicator 214 to indicate whether the audio playing device is in DVS 1 mode, DVS 2 mode or in audio media player mode. When the system is in audio media player mode the audio of the audio media player travels directly into output 104. When the system is switched to DVS 1 mode the audio played by the audio media player (if any) is routed to DVS 1 output 208 instead of to audio output 204. If a special media containing a time code signal is used in the audio media player then this DVS 1 output signal will contain the time code audio signal to indicate to the connected DVS the required manipulation of the digital audio to play according to the audio media player interface. In addition, when the system is switched to DVS 1 mode the signal from DVS 1 input 210 is routed to audio output 204 to outputs the DVS 1 audio through the same connection as when the audio media player mode is used. When the system is switched to DVS 2 mode the audio played by the audio media player (if any) is routed to DVS 2 output 214 instead of to audio output 204. If a special media containing a time code signal is used in the audio media player then this DVS 2 output signal will contain the time code audio signal to manipulate DVS 2 played audio according to audio media player interface. In addition, when the system is switched to DVS 2 mode the signal from DVS 2 input 216 is routed to audio output 204 to outputs the DVS 2 audio through the same connection as when the audio media player mode is used or DVS 1 Mode is used.

As a result, connecting a DVS to the audio playing device 202 does not require any change in existing wiring connections between audio playing device and a device connected to it that receives its output such as an audio mixer. Furthermore, when audio from the audio media player is playing, a DVS may be connected or disconnected using the DVS connection unit 106 without interrupting the audio playing of the audio media player. When a DVS is fully connected and a DJ handover is required all that is needed for changing between DVS mode and audio media player mode is to change the switch 212, and similarly when a DJ using a DVS wants to change with a DJ using the audio media player, the change is as simple as changing switch 212.

The switch 212 may be viewed as a way to select an active device of the audio playing device so that the active device chosen by switch 212 is the one that the audio output plays. The audio of the active device is manipulated by the audio media player interface.

After the switch is changed to audio media player mode and audio plays from the audio media player, the DVS connections can be disconnected without interrupting the audio from the audio media player. Therefore two DJs one using a DVS and the other playing audio media such as CDs or records can easily change between themselves in a change of a switch position, without disconnecting existing connections between audio media player and a mixer for example and without the need to wait for connections or disconnections of a DVS to be made.

Furthermore, when audio from a DVS is playing, a second DVS may be connected or disconnected using the DVS connection unit 206 without interrupting the audio playing of the first DVS. When the second DVS is fully connected and a DJ handover is required between the different DVS all that is needed for changing between DVS 1 mode and DVS 2 mode is to change the switch 212. Once the change has been made, the connections of DVS 1 can be disconnected during the playing of DVS 2 without interrupting DVS 2 playback. Therefore two DJs both using DVS 1 and DVS 2 can easily change between themselves with a change of a switch, without disconnecting existing connections between DVS 1 and a mixer for example and without the need to wait for connections of DVS 2 or disconnections of DVS 1 to be made before the change is made.

In some embodiments no time code audio is required and no need exists to route played audio signal into DVS 1 output 208 and DVS 2 output 214. Such a case may be when audio media player is equipped for example with a MIDI controller and can output control information to the DVS using a USB connection.

In some embodiments an additional headphone piece and a selector may be added to the audio playing device for monitoring DVS 1 input or DVS 2 input. The selector can choose which DVS is monitored. This monitoring is intended for allowing listening to DVS 2 input while DVS 1 is playing or vice versa. In the case DVS 1 is playing and DVS 2 is set up, it is possible to check that DVS 2 input connections are properly connected prior to starting using a DVS 2 during the playing of DVS 1. In this manner the user that is going to play next can make sure that when changing the switch to DVS 2 mode, that DVS 2 is ready to play and that the input connections and cables are connected properly.

In some embodiments the connections of DVS 1 input 210 and/or DVS 1 output 208 as well as DVS 2 input 216 and/or DVS 2 output 214 may be implemented for example in USB or other similar means so that the audio travels through the USB connection in this example instead of through connections as mentioned above. The audio travels directly into output 204 connectors in this case in a similar manner. In some embodiments the switching between DVS 1, DVS 2 and audio media player modes may become automatic or controlled from the DVS. In some embodiments where time code data is not required, such as when control data is received through a USB or MIDI connection, only DVS 1 input 210 and DVS 2 input 216 are required so that these audio channels may also travel through a USB connection and in some embodiments, a single USB connection may be used to transfer control and audio information. As a result, only a USB connection may be required and in some embodiments the switch 212 may become unnecessary. In some systems, both USB approach and external connectors may be present.

In some embodiments one or more audio output channels may be added in addition to audio output 204.

Figure 3:
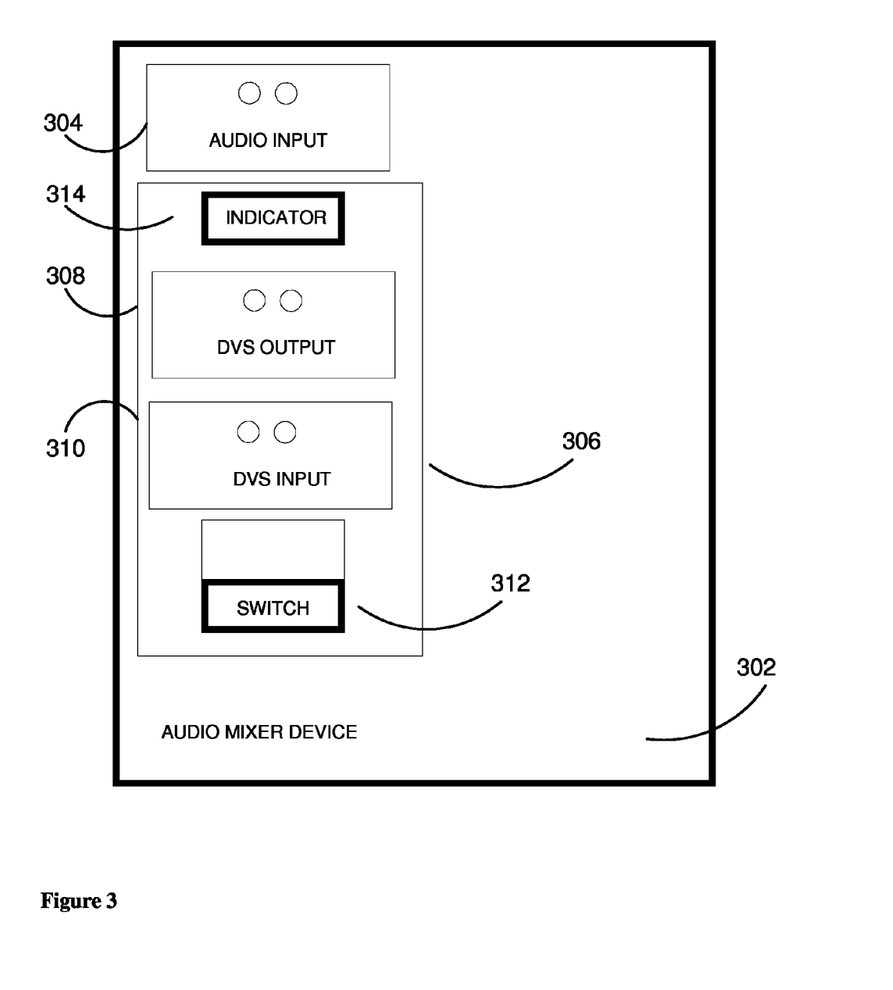
FIG. 3 is a block diagram illustration of an audio mixing device equipped with an audio switching device for DVS, in accordance with an embodiment of the present invention.

Reference is now made to FIG. 3, which is a block diagram illustration of an audio mixing device equipped with DVS connectors, in accordance with an embodiment of the present invention comprising an audio mixer not shown in the drawing contained within audio mixing device 302; an audio input 304 for receiving an input audio signal where an audio mixer may include more than one input connection; a DVS connection unit 306 for connecting with a DVS without interrupting the input from audio input 304. The DVS connection unit 306 comprises a DVS output connection 308 that connects into a DVS; an DVS input 310 for receiving input from a DVS; a switch 312 to switch between DVS mode and audio input mode; and an indicator 314 to indicate whether the audio mixer channel is in DVS playing mode or in audio input mode. Note this indication may be for one specific audio channel since an audio mixer may contain several audio channels. When the system is in audio input mode the audio from the audio input 304 travels directly to the audio channel. When the audio mixer channel is switched to DVS mode the audio received in audio input 304 (if any) is routed into DVS output 308. The audio from DVS input 310 is then routed into the audio mixer channel instead of audio input 304. If a special media containing a time code signal is used as input from audio input 304 then DVS output 308 will contain the time code audio signal to indicate to the DVS what portion of the music part to play. As a result, connecting a DVS to the audio mixing device 302 does not require the changing of wiring connections between audio playing device connected to audio input 304. Furthermore, when audio from the audio device playing into audio input 304, a DVS may be connected or disconnected using the DVS connection unit 306 without interrupting the audio from the audio device. When a DVS is fully connected and a DJ handover is required all that is needed for changing between audio input mode and DVS mode is to change the switch 312, and similarly when a DJ using a DVS wants to change with a DJ using the audio of the audio device coming into audio input 304, the change is as simple as changing switch 312. After the switch is changed to audio input mode and audio plays from the audio device connected to audio input 304, the DVS connections can be disconnected without interrupting the audio from audio input 304 Therefore two DJs one using a DVS and the other playing audio media such as CDs or records can easily change between themselves in a change of a switch, without needing to disconnect existing connections between device and a mixer and without the need to wait for connections or disconnections of a DVS to be made. In some embodiments no time code audio is required and no need exists to route played audio signal into DVS output 308. Such a case may be when an audio device or a controller is equipped for example with a MIDI controller and can output control information to the DVS using a USB connection.

The presented device in FIG. 3 adds connections to a DVS in a clear and simple manner. Various switchboxes for example which may have some switching functionality but since these are not dedicated for DVS use for example without switching both time code signal and DVS input, such can cause confusion especially in the middle of a performance and are therefore undesired.

In some embodiments a connection for two of more DVS systems is available in audio switching device for DVS 306 in a similar manner as is presented in FIG. 2. In such a case it is possible to proceed with a handover process between two DJs each with his or her own DVS. The first DJ who is currently playing is uninterrupted by the second DJ who arrives and connects to the second DVS available connections. When its time to switch a switch is changed to change the mode to the second DVS. When the second DVS is playing the first DVS can be disconnected without interrupting the second DVS playing. In this manner a DJ handover between two DVS systems is simplified and eased allowing connections to be made during other DVS playing and allowing leaving existing cables between audio device and mixer in place.

When requiring a handover process for switching between DJs one using audio device and the other a DVS, simultaneous setup and quick changing between DJs is possible as well by changing a switch. If the playing DJ is using regular audio media (CDs, vinyl etc) and the following DJ uses a DVS the DVS is connected while the first DJ plays. Then when it is time for a switch, the next DJ changes a switch for the audio deck that is currently not playing and start playing when ready. Following ending of the other deck the switch is turned for the other deck channel and then that deck is ready for use by the DJ using DVS. In case where time code media is required, these are inserted just before the changing between the DJs. When a DJ using standard media follows a DJ who uses DVS, the next DJ switches the switch of the non playing deck and is ready to play audio media straight away. Following is done for the second deck. The DVS DJ can now remove the extra DVS connections without worrying about interrupting current DJ who uses audio media. It is also possible to switch between two DJs each using a DVS when only one connection for DVS is available. The next DJ to play removes DVS connections and places the new DVS connections for the first deck and when the first deck plays, the same is repeated the second deck. From this description it can be seen that the DJ handover process or switching between DJs is seamless using the current disclosure.

In some embodiments the DVS connectors and switch appear on the front of the device in order to ease the connection to a DVS system.

In some embodiments where audio time code is not necessary for DVS systems, such as audio devices with USB connections that act like MIDI controllers, the time code outputs may not be used at all. Furthermore in such audio devices, only a connection for output signal may be constructed. Therefore in FIG. 3 for example, time code output signal 308 may not be necessary and may be omitted.

Figure 4:
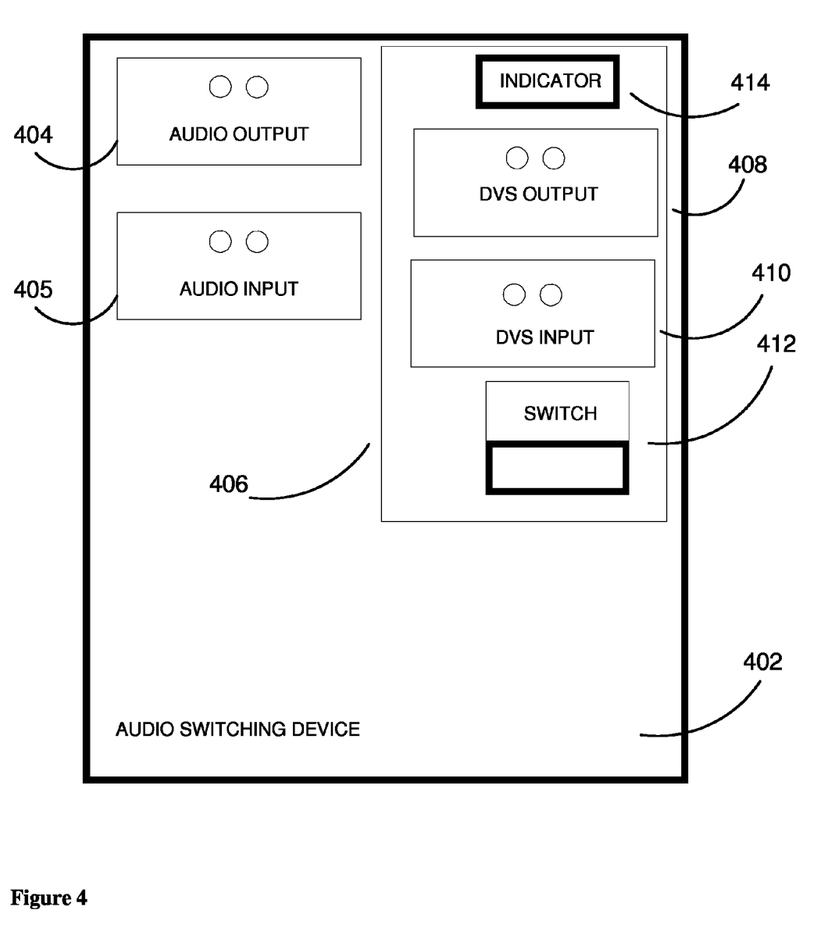
FIG. 4 is a block diagram illustration of an audio switching device for DVS, in accordance with an embodiment of the present invention.

Reference is now made to FIG. 4, which is a block diagram illustration of an audio switching device for DVS, in accordance with an embodiment of the present invention comprising add on unit 402 which may be added on to an audio unit or to an audio mixer. The audio switching device 402 together with an audio device provide a similar case to FIG. 1 and the audio switching device 402 together with an audio mixer provide a similar case to FIG. 3. Said audio switching device for DVS further comprising an audio output connection 404 where audio signal travels out, possibly into an audio mixer; an audio input 405 connection for receiving input from a coupled audio device; a DVS connection unit 406 for connecting with a DVS without interrupting the audio output 404 as well as not interrupting the audio input 405. The connections from audio output 404 and from audio input 405 remain in place whether a DVS is connected or not. The DVS connection unit 406 comprises a DVS output 408 for routing time code output signal to DVS from audio input 405 when a DVS is used; DVS input 410 is returned from a DVS and routed to audio output 404 when a DVS is used; a switch 412 to switch between DVS mode and audio input mode; and an indicator 414 to indicate whether the audio switching device is in DVS playing mode or in audio input mode. When the system is in audio input mode the audio from audio input 405 from coupled audio device travels directly into audio output 404. When the system is switched to DVS mode the audio input 405 signal (if any) is routed into DVS output 408 to output time code output to DVS for manipulating digital audio by said coupled audio device. The DVS input 410 is routed to audio output 404 and output normally as if connected audio playing device outputs the audio signal. As a result connecting a DVS to the audio switching device does not require changing existing connections between audio playing device and audio input 405 and connected device such as audio mixer to audio output 404. Furthermore, changing between DVS mode audio input mode playing is as easy as moving a switch, therefore two DJs one playing with a DVS system and the other playing using standard audio media for example CD or record, can easily change between themselves with a change of a switch position without the need to wait for connections being made. The connections for DVS can take place during the playing of audio input 405. In some embodiments no time code audio is required and no need exists to route played audio signal into time code output 408.

In some embodiments a connection for two of more DVS systems is available in DVS connection unit 406 in a similar manner as is presented in FIGS. 2 and 3. In such a case it is possible to proceed with a handover process between two DJs each with his or her own DVS. The first DJ who is currently playing is uninterrupted by the second DJ who arrives and connects to the second DVS connections available. When its time to switch, switch 412 is changed to change the mode to the second DVS. When the second DVS is playing the first DVS can be disconnected without interrupting the second DVS playing. In this manner a DJ handover between two DVS systems is simplified and eased allowing connections to be made during other DVS playing and allowing leaving existing cables between audio device and audio input 405 and audio output 404 and mixer in place.

The switch 412 may be viewed as a way to select an active device connection so that the active device connection chosen by switch 412 is the one that is played through the audio output. In this case an active device connection may be audio input and connected DVS connections and in other embodiments where more than one DVS may be connected, the chosen connection may be audio input connection and connected DVS connections. The active device audio is manipulated by the coupled audio device when a DVS is active, for example through the routed audio time code that is played by the coupled audio device.

In some embodiments an additional headphone connection may be added to the audio switching device for monitoring DVS input while audio media player is playing and if connections to a second DVS exists then it is possible to monitor one DVS when the second is in use.

In some embodiments the audio switching device may connect to a coupled audio device, for example as a fitted accessory and in some embodiments may be connected in a permanent fashion or in a semi permanent fashion so that the audio switching device is kept as part of the audio device. In such embodiments the input audio connector 405 from the audio device connects directly to the audio device. The output audio connector 404 may then connect to the mixer similar to how the audio device would connect to the mixer. These two connections, 404 and 405 remain unchanged once connected, before and after a DVS system is connected using the present embodiment. In some embodiments these connections appear on the back of the media device while connections for the DVS connection unit 406 appear on the front of the device so as to have only DVS connections available for connection and disconnection.

In some embodiments the add-on unit may connect to an audio mixer, for example as a fitted accessory and in some embodiments may be connected in a permanent fashion or in a semi permanent fashion so that the add on is kept as part of the audio mixer. In such embodiments the output audio connector 404 connects directly to the audio mixer. The input audio connector 405 may then connect to the audio device similar to how the audio device would connect to the mixer. These two connections, 404 and 405 remain unchanged once connected, before and after a DVS system is connected using the present embodiment. In some embodiments these connections appear on the back of the media device while connections for the DVS connection unit 406 appear on the front of the device so as to have only DVS connections available for connection and disconnection.

In some embodiments the connections of 410 and/or 408 may be implemented in USB so that the audio travels through the USB connection and the connections of 408 and 410 are not required. The audio travels directly into audio output 404 connectors. In this case the switching between DVS and audio input mode may become automatic or controlled from the DVS. In some embodiments where time code data is not needed such as when control data is received through a USB connection, only DVS input connection is required and in addition that audio data may also travel through the USB connection. As a result, only a USB connection may be required and the switch may become unnecessary. In some systems, both USB approach and external connectors may be present.

Figure 5A:
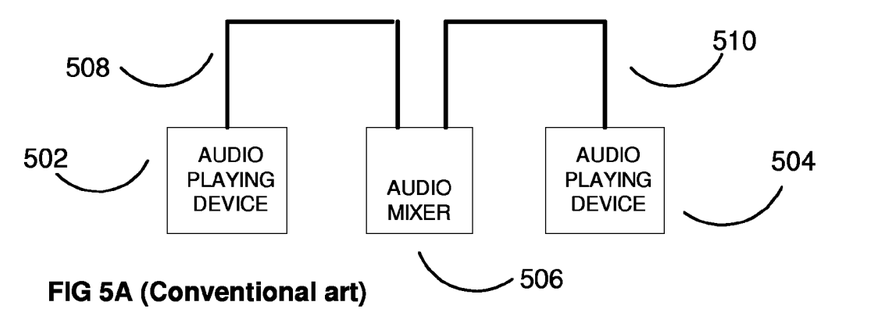
FIG. 5A is a block diagram illustration of two audio playing devices connected to an audio mixer, in accordance with an embodiment of the present invention.

Reference is now made to FIG. 5A, which is a block diagram illustration of two audio playing devices connected to an audio mixer, in accordance with an embodiment of the present invention comprising an audio playing device 502 connected to audio mixer 506 through connection 508 and a second audio playing device 504 connected to the audio mixer 506 through connection 510. The connections 508 and 510 may be stereophonic. This manner of connection is usually how connection of two or more audio playing devices connect to a single audio mixer.

Figure 5B:
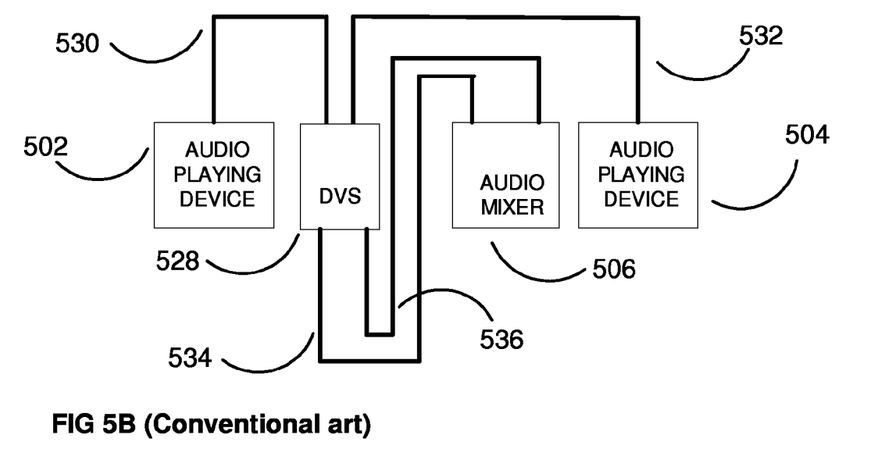
FIG. 5B is a block diagram illustration of two audio playing devices connected to a DVS that is connected to an audio mixer, in accordance with an embodiment of the present invention.

Reference is now made to FIG. 5B, which is a block diagram illustration of two audio playing devices connected to a DVS that is connected to an audio mixer, in accordance with an embodiment of the present invention comprising audio playing device 502 connected to DVS system 528 through a connection 530 and a second audio playing device 504 connected to the DVS 528 through connection 532. The DVS 528 is connected to audio mixer 506 through connection 534 for first audio playing device 502 and through connection 536 for second audio playing device 504. Each connection may be stereophonic. The connections 530 and 532 transfer the time code for controlling the location direction and speed played and the DVS outputs the audio to the mixer.

The transition between FIG. 5A in which a DVS is not connected, to FIG. 5B where a DVS is connected, using the same audio playing devices 502 and 504 and the same mixer 506 requires the steps of disconnecting the wires 508 and 510 going between the audio playing devices and the audio mixer; then connecting these to the correct inputs into the DVS as connections 530 and 532. Then connecting the wires from DVS into the correct place in the mixer as connections 534 and 536. Keeping in mind these connections are usually stereophonic, this leaves a lot of place for error or a slightly loose wire somewhere. If this change needs to be done during a performance this can be a difficult and stressing experience. More importantly, the connection of a DVS channel during the playing of that same audio channel is not possible. A DVS handover is usually made by playing audio device on one device while disconnecting the other device and connecting the DVS. If one mistakes the cables between the channels this will cause silence in the venue. This is greatly undesired and this invention aims at solving this problem.

Figure 6A:
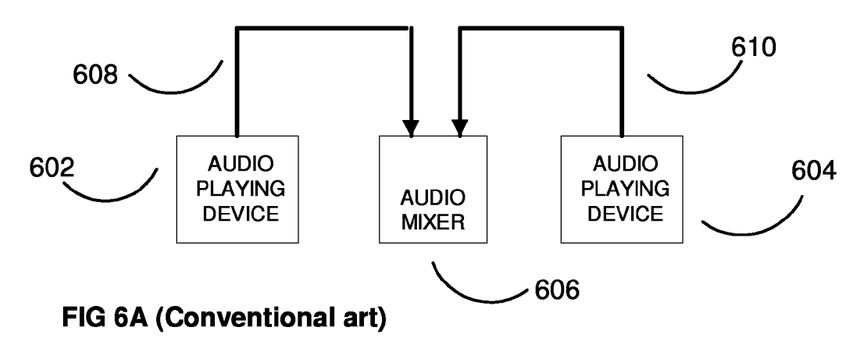
FIG. 6A is a block diagram illustration of two audio playing devices equipped with an audio switching device for DVS connected to an audio mixer, in accordance with an embodiment of the present invention.

Reference is now made to FIG. 6A, which is a block diagram illustration of two audio playing devices equipped with an audio switching device for DVS connected to an audio mixer, in accordance with an embodiment of the present invention comprising an audio playing device equipped with DVS connectors 602 connected to audio mixer 606 through connection 608 with output signal into the mixer and a second audio playing device equipped with DVS connectors 604 connected to the audio mixer 606 through connection 610 with output signal into the mixer. The connections 608 and 610 output signal from audio playing device into mixer may be stereophonic. This manner of connection is the standard connection to two or more audio playing devices to a single audio mixer.

Figure 6B:
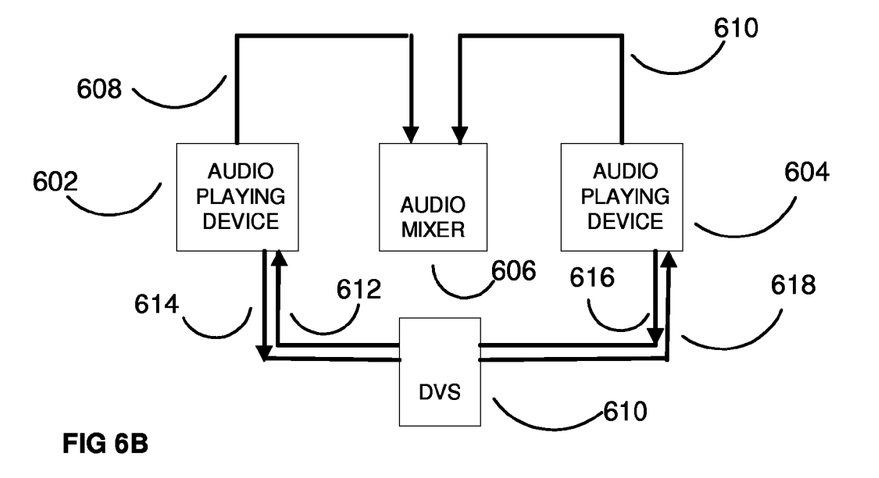
FIG. 6B is a block diagram illustration of two audio playing devices equipped each with an audio switching device for DVS connected to an audio mixer and a DVS that is connected to the audio switching device of both audio playing devices, in accordance with an embodiment of the present invention.

Reference is now made to FIG. 6B, which is a block diagram illustration of two audio playing devices equipped each with an audio switching device for DVS connected to an audio mixer and a DVS that is connected to the audio switching device of both audio playing devices, in accordance with an embodiment of the present invention comprising an audio playing device 602 equipped with audio switching device for DVS connected to audio mixer 606 through connection 608 and a second audio playing device 604 equipped with an audio switching device for DVS connected to the audio mixer 606 through connection 610. The connections to the audio mixer 608 and 610 output signal from audio playing devices into the mixer and may be stereophonic. These are the exact connection and setup as described in FIG. 6A. In addition a DVS 610 is connected to audio playing device 602 through its audio switching device for DVS connectors through connections 612 and 614 and DVS 610 is connected to audio playing device 604 through its audio switching device for DVS connectors through connections 616 and 618. In this DVS setup the audio playing devices 602 and 604 play time code audio into DVS through connections 614 and 616 respectively so that connections 614 and 616 output audio from each audio playing device to the DVS 610. This may be done by switching the output of the playing audio to be played into connections 614 and 616 respectively instead of to 608 and 610 respectively. In some embodiments this may be done by a switch in each of the audio playing devices. Furthermore, in this DVS setup the audio is returned from the DVS into the audio playing devices 602 and 604 through connections 612 and 618 respectively. These connections carry the audio signal output from DVS 610 into audio playing devices 602 and 604. The audio from the DVS may now be output into connections 608 and 610 respectively, instead of the audio played by the audio playing devices which includes the time code audio. This audio routing from connections 612 into 608 and from connection 618 into 610 may also be done by the switch in each audio playing device.

In this manner we have the audio playing devices and an audio mixer connected through connections 608 and 610 which stay connected when a DVS is connected and disconnected.

The importance of not changing cable connections during a live performance is because connections tend to be connected to wrong location in time of stress. Furthermore connections may break or become weak and affect the quality of the signal. In addition, when a connection is not changed there is one less thing to check, which makes an important factor during a performance.

A DJ playing CDs or vinyl can play without interruption or wire disconnections and only a change in a switch changes the system into a DVS system. A DVS system may be connected during playing of CDs or vinyl without interrupting playback. Similarly a DVS may be disconnected during the time of CD or vinyl playback.

In this manner this disclosure as explained in FIG. 6 greatly simplifies the steps as described in FIG. 5 namely changing existing wiring and connection to the audio mixer. In addition, changing between DJs with a DVS and one playing standard vinyl or CDs is quick and seamless requiring only changing a switch. Changing with another DJ using a DVS system only requires adding connectors to and from the DVS for each audio playing device and does not require changing existing connectors between audio playing devices and audio mixer.

In a similar manner audio playing devices equipped with audio switching device for DVS that have connections to two DVS can handle the above in addition to a simple change between two DJs using DVS where one DVS system can be connected while the other DVS is in use playing and the change occurs by changing the switch as described in FIG. 2 for example.

The presented device in FIG. 1 and in FIG. 2 in accordance with FIG. 6 shows how a DVS can be connected to a standard setup of FIG. 6A with two audio playing devices as displayed in FIG. 6B in a manner that wiring of existing connections between audio playing devices and audio mixer stay in place and no rewiring is required. The advantage of such a setup is that no existing rewiring needs to be changed or removed and only DVS related connections need to be connected. Furthermore DVS connections and disconnections can be made simultaneously to playing back audio from audio playing devices and in cases where two DVS are in use, one DVS may be set up during the time when the other DVS is being connected or disconnected.

If only one DVS connection is available, two DJs with DVS can change between themselves by changing the DVS connections of each channel when that channel is not in use. Although it is preferred that two DVS connections are available, one may be sufficient and keeps connections between audio player and mixer in place.

Figure 6C:
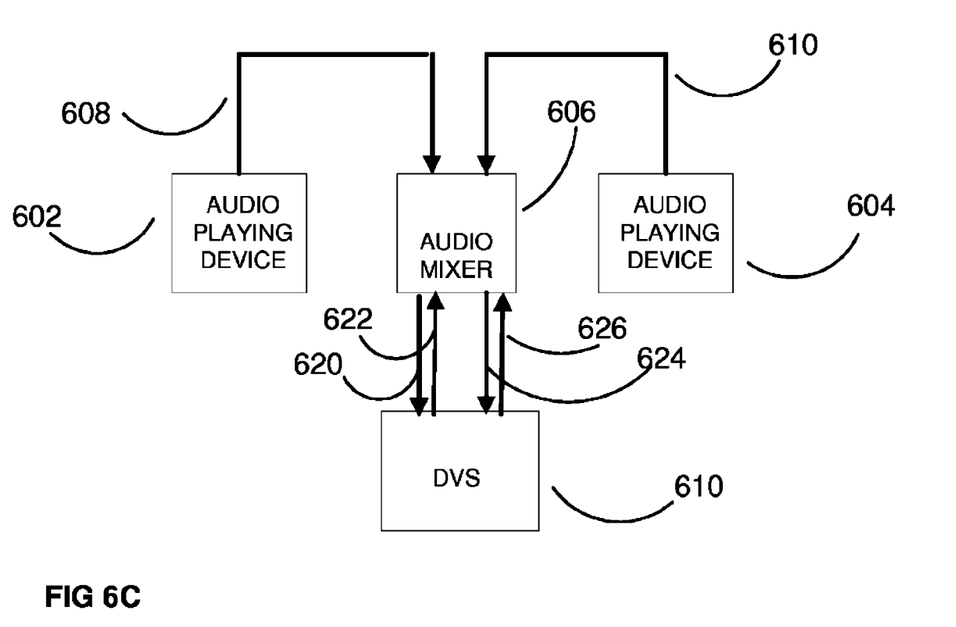
FIG. 6C is a block diagram illustration of two audio playing devices connected to an audio mixer equipped with an audio switching device for DVS and a DVS that is connected to the audio switching device for DVS of the audio mixer, in accordance with an embodiment of the present invention.

Reference is now made to FIG. 6C, which is a block diagram illustration of two audio playing devices connected to an audio mixer equipped with an audio switching device for DVS and a DVS that is connected to the audio switching device for DVS of the audio mixer, in accordance with an embodiment of the present invention comprising an audio playing device 602 connected to audio mixer 606 equipped with DVS connectors through connection 608 and a second audio playing device 604 connected to the audio mixer 606 equipped with DVS connectors through connection 610. The connections 608 and 610 output signal from audio playing device into mixer and may be stereophonic. These are the exact connection and setup as described in FIG. 2A. In addition a DVS 610 is connected to audio mixer 606 equipped with DVS connectors through connections 620 and 622 and DVS 610 is connected to audio mixer 606 DVS connectors through connections 624 and 626. In this DVS setup the audio playing devices 602 and 604 may play time code audio into DVS through connections 620 and 624 respectively so that connections 622 and 626 output audio from DVS for each of the audio playing devices. This may be done by switching the received output of the playing audio to be played from connections 622 and 626 respectively instead of to 608 and 610 respectively. In some embodiments this may be done by a switch in the audio mixer. Furthermore, in this DVS setup the audio is returned from the DVS into audio mixer 606 through connections 622 and 626 respectively. These connections carry the audio signal output from DVS 610 into audio mixer. The audio from the DVS may now be replaced by the output from connections 608 and 610, instead of the audio played by the audio playing devices which includes the time code audio. This audio routing from connections 622 instead of 608 and from connection 626 instead of 610 may also be done by a switch in the audio mixer.

In this manner a setup of audio playing devices and an audio mixer having connections that stay in place when a DVS connects to the setup without changing the already connected wires between audio playing devices and audio mixer.

The importance of leaving existing cable connections in place and not requiring the disconnecting of cables during a live performance is due to the fact that connections tend to be connected to wrong location in time of stress. Furthermore connections may break or become weak and affect the quality of the signal. In addition, when connections do not need to change, that is one less thing to worry about which is another important aspect of this matter.

A DJ playing normal CDs or vinyl can play without interruption or wire disconnections and only a change in a switch changes the system into a DVS system. When changing from a DVS system the DJ using CDs or vinyl can play while the DVS is being disconnected and a DVS may be connected while that DJ plays. Also if two DVS are used and need to be changed the setup may be simplified with the above setup and even more if there is room for two DVS to connect to.

In this manner it may be seen that the disclosure as explained in FIG. 6 greatly simplifies the steps as required in FIG. 5 namely changing existing wiring and connecting to the existing audio mixer. In addition, changing between DJs with a DVS or playing standard vinyl or CDs is quick and seamless requiring only changing a switch position. Changing with another DJ using a DVS system only requires adding the DVS related connections and does not require changing existing connections between audio playing devices and audio mixer.

Please note regarding similar numbering of FIGS. 6A, 6B and 6C that in FIG. 6A none of the devices require DVS connections as explained in this disclosure. In FIG. 6B the audio playing devices 602 and 604 require to have DVS connections (or audio switching device for DVS) and the audio mixer 606 does not require DVS connections. In FIG. 6C the audio mixer 606 requires to have DVS connections for two connected channels and the audio playing devices do not require DVS connections. Please note each connection may be stereophonic. The similar numbering is used to simplify explanations and although the use of similar numbering is for similar devices, the fact that each has or does not have an audio switching mechanism for DVS is dependent on the relevant case in the image as is explained in this disclosure.

It may be appreciated by those skilled in the art of the present embodiments that the present invention allows adding a DVS to an existing setup of audio devices and audio mixer without changing, disconnecting or rewiring existing connections between audio devices and mixer. A performer can arrive with a DVS and connect the DVS to existing specified connections intended for DVS during the playing of audio from the audio devices and with a changing of a switch can start using the DVS. The preferred embodiment has the following advantages over existing art:

(a) The present invention allows connecting a DVS to an existing audio setup without changing existing wiring.
(b) The present invention allows connecting a DVS to an existing audio setup during the playing of another audio source.
(c) The present invention allows switching performers performing one after the other in a seamless manner, whether using DVS systems or standard media.
(d) The present invention prevents problems that may occur due to removing existing cables and lessens the amounts of cables required to be handled during a connection to a DVS.

CONCLUSION, RAMIFICATIONS AND SCOPE

Accordingly, the reader will see that the disclosure of this invention provides a ways to facilitate DJ handover when using DVS.

Furthermore the closure of this invention has the additional advantages in that:

(a) The DVS connections may take place during the playing and using of the audio devices without interrupting audio output from these devices.
(b) The present invention allows present wiring connections to remain unchanged when a performer connects a DVS.
(c) The present invention allows present wiring to remain unchanged when performer with DVS system removes the DVS.
(d) The DVS disconnection may take place during the playing and using of the audio devices without interrupting audio from these devices.
(e) A DVS may be connected to an audio setup when another DVS is in use without interrupting the playing DVS.
(f) A DVS may be disconnected from an audio setup when another DVS is in use without interrupting the playing DVS.
(g) Changing between DVS systems or between a DVS and an audio system is quick as changing of a switch.
(h) The present invention provides clear and simple DVS connections that diminish chances of mistakes and errors during a performance.

Although the description above contains many specifications, these should not be constructed as limiting the scope of the invention but as merely providing illustrations of some exemplary embodiments of this invention.

For example, more than two decks may be of use with this invention; a connection to more than one DVS system may be possible; video may also be used in this setup for video playing devices; an audio switching device for DVS may be combined in different ways with different devices, the connections described between audio devices, mixers and DVS may be accomplished through audio connections, digital connections transferring data representing audio, the control information may be time coded audio, MIDI or through other means and so on.

While certain features of the invention have been illustrated and described herein, many modifications, substitutions, changes, and equivalents may now occur to those of ordinary skill in the art. It is, therefore, to be understood that the appended claims are intended to cover all such modifications and changes as fall within the true spirit of the invention.

It is expected that during the life of this patent many relevant audio devices, audio mixers and DVS systems will be developed and the scope of the terms herein, particularly of the terms "time code signal", "control signal", "MIDI control", "output signal" whether analog or digital, connection such as USB and MIDI, "audio switching device for DVS", are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An audio playing device configured to facilitate the handover process of Digital Vinyl Systems (DVS) said audio playing device comprising:
    an audio media player for playing audio media wherein said audio media player does not include an audio mixer for mixing two or more different audio playing sources simultaneously;
    an audio output connection for sending audio output out of said audio playing device;
    one or more DVS connections for connecting one or more external DVS directly to said audio playing device wherein said external DVS outputs audio signal into said one or more DVS connections and said audio media player controls timing of audio played by said external DVS;
    a switching mechanism for selecting an active device between said audio media player and one or more external DVS connected to said one or more DVS connections said switching mechanism configured for routing audio output of said selected active device to said audio output connection and said audio playing device configured for controlling playback timing of said selected active device whereby an external DVS is connected directly to said audio playing device while current active device is in use and said switching mechanism activates said external DVS as current active audio playing device controlled by said audio media player not requiring additional equipment to facilitate DVS handover process.

2. The audio playing device of claim 1 wherein said one or more DVS connections further comprising DVS audio input connections for routing audio from said audio media player to an external DVS when said external DVS set as active device by said switching mechanism whereby connection of cables between DVS and said DVS audio input connections for receiving time coded audio for controlling said DVS playback timing do not interfere current active device and whereby direct connection to said DVS audio input connections do not require additional equipment or disconnecting existing connected cables to facilitate DVS handover process.

3. The audio playing device of claim 1 wherein said audio playing device is configured for sending a control signal to an external DVS for controlling playback timing of said external DVS when said external DVS is set as active device by said switching mechanism whereby connecting DVS to said audio playing device does not interfere current active device and does not require additional equipment to facilitate DVS handover process.

4. The audio playing device of claim 1 wherein an external DVS is disconnected from one of said one or more DVS connections during the playing of a selected active device and during the controlling of playback timing of said selected active device without interrupting routed audio of said selected active device to said audio output connection and without interrupting controlling of playback timing of said selected active device without requiring additional equipment to further facilitate DVS handover process.

5. The audio playing device of claim 1 further comprising a headphone connection for monitoring an external inactive DVS directly connected to one of said one or more DVS connections of said audio playing device said audio playing device configured for playing said external inactive DVS audio to said headphone connection during playing of a selected active device without interrupting routed audio of said selected active device to said audio output connection and without interrupting controlling of playback timing of said active device by said audio playing device whereby monitoring external inactive DVS during playing of a selected active device using said headphone connection without requiring additional equipment to further facilitates DVS handover process.

6. The audio playing device of claim 1 wherein said switching mechanism is configured to route audio of said audio media player into said audio output connection when said audio media player is set as active device and said switching mechanism is configured to route audio of an external DVS into said audio output connection when said external DVS is set as active device following setup of said external DVS whereby said external DVS output audio and said audio media player output audio make use of single said audio output connection sending selected active device audio to a device connected to said audio output connection without requiring additional equipment or disconnecting existing connected cables to facilitate DVS handover process.

7. A method of connecting a Digital Vinyl System (DVS) to an audio media player with no audio mixer functionality to facilitate the handover process of DVS the method comprising:
   a. playing audio of a currently active audio device,
   b. controlling playback timing of audio played by said currently active audio device using said audio media player configured for playing a single audio media;
   c. connecting an external DVS directly to said audio media player during playing of audio of said currently active audio device and during controlling of playback timing of said currently active audio device wherein no additional equipment is required for connecting said external DVS,
   d. selecting connected said external DVS as currently active audio device
   e. playing audio from said external DVS and controlling audio playback timing of said external DVS using said audio media player when said external DVS is selected as currently active audio device.

8. A method according to claim 7 wherein disconnecting said external DVS during playing of currently selected active audio device and during the controlling of playback timing of said selected active audio device without interrupting playing of said currently selected active audio device and without interrupting controlling of playback timing of said selected active audio device wherein no additional equipment is required.

9. A method according to claim 7 wherein selecting connected said external DVS as currently active audio device is further configured to send control data from said audio media player to said selected DVS for controlling playback timing of audio played by said selected DVS using said audio media player.

10. An audio playing device comprising Digital Vinyl System (DVS) connections for directly connecting one or more DVS to said audio playing device and further comprising a switching mechanism for selecting currently active device between said audio playing device and said one or more DVS connections wherein said audio playing device does not include an audio mixer whereby connecting a DVS directly through said DVS connections does not interrupt current audio playing and does not require additional devices or disconnecting of existing cables to facilitate handover process of DVS taking place by said switching mechanism for selecting currently active device.

11. The audio playing device of claim 10 wherein said DVS connections further comprising audio output connections for outputting time coded signal whereby connecting DVS for receiving time code signal does not interfere currently played audio with no additional required device to facilitate handover process of DVS.

12. The audio playing device of claim 10 wherein said audio playing device is configured for sending control signal to an external DVS for controlling playback timing of said external DVS whereby connecting DVS for receiving control signal does not interfere currently played audio with no additional required device to facilitate handover process of DVS.

13. The audio playing device of claim 10 wherein an external DVS is being connected to one of said DVS connections during the playing and the controlling of currently active device without interrupting said active device.

14. The audio playing device of claim 10 wherein an external DVS is being disconnected from one of said DVS connections during the playing and the controlling of currently active device without interrupting said active device.

15. The audio playing device of claim 10 wherein said switching mechanism is configured to route audio of currently active device into said audio output connection whereby wire connection to said audio output connection do not require disconnection for connecting a DVS.

* * * * *